United States Patent [19]
Sakurai

[11] 3,868,628
[45] Feb. 25, 1975

[54] DEVICE FOR INDICATING DISCONNECTION OF AUTOMOBILE LAMPS

[75] Inventor: Yasuhiko Sakurai, Kariya, Japan
[73] Assignee: Nippondenso Co. Ltd., Aichi-ken, Japan
[22] Filed: Nov. 21, 1973
[21] Appl. No.: 417,938

Related U.S. Application Data
[63] Continuation of Ser. No. 175,518, Aug. 27, 1971.

[30] Foreign Application Priority Data
Aug. 28, 1970 Japan .......................... 45-86297[U]
Aug. 28, 1970 Japan .......................... 45-86298[U]
Aug. 28, 1970 Japan .......................... 45-86299[U]

[52] U.S. Cl. ................. 340/80, 340/81 F, 340/251
[51] Int. Cl. ............................................. B60q 1/38
[58] Field of Search .................... 340/80, 251, 81

[56] References Cited
UNITED STATES PATENTS
3,171,096  2/1965  Murray et al. ................. 340/251 X
3,250,950  5/1966  Reiche .......................... 340/251 X
3,421,143  1/1969  Signorile ....................... 340/251 X Primary Examiner—John W. Caldwell
Assistant Examiner—Donnie L. Crosland
Attorney, Agent, or Firm—Cushman, Darby & Cushman

[57] ABSTRACT

A device for indicating disconnection of automotive lamps comprising a current winding energized by a load current of a lamp and a voltage winding phase-inverted from said current winding for generating a small magnetomotive force, said two windings combining to operate the contact of an indicator circuit, whereby disconnection of one of four or more parallel-connected lamps is successively detected and indicated under widely varying conditions of a source voltage, thus overcoming the limit of detection which is posed by the load characteristic of the lamps.

2 Claims, 5 Drawing Figures

DEVICE FOR INDICATING DISCONNECTION OF AUTOMOBILE LAMPS

This is a continuation of application Ser. No. 175,518, filed Aug. 27, 1971.

BACKGROUND OF THE INVENTION

1. Field of the Invention

This invention relates to a device for informing an automobile driver of a lamp failure due to its disconnection.

2. Description of the Prior Art

The lighting system in a typical automobile includes the headlights, parking lamps, direction-signal lamps, side marker lamps, stop lamps, backup lamps and tail lamps. Among these lights, the conventional lighting system is provided with a function to indicate the breaking of wire only for the direction-signal lights. The recent rapid extension of car ownership has resulted in an increased number of automobile traffic accidents, posing a serious social problem. Among the traffic accidents caused by automobiles, those attributable to inadequate maintenance of automobile lights are especially harmful. They should therefore be prevented by great care, by keeping the lighting in good order and conditions so that the driver may not fall foul of the Law. For this purpose, the necessity is increasingly recognized for a device for indicating the breakage of wire of automobile lights.

On the other hand, it is current practive to provide a plurality of parallel-connected similar lights in order to improve safety. As a result, it is necessary to provide a highly-sensitive wire-breakage indicator which is capable of detecting disconnection of even only one of the parallel-connected plurality of lights.

A conventional indicator of this kind which is disclosed in Japanese Utility Model Publication No. 9432/1959 employs a current relay which operates in response to the load current of the lights, the contact circuit of the current relay energizing failure indicators, such as a pilot lamp. This indicator employs a system in which the load current of a light is detected by the current relay having a single current winding, and therefore applications are limited. In addition, this device is used with incandescent lamps in which the temperature of the tungsten filament varies greatly when it is turned on and off, with the result that a current 10 to 20 times larger than the normal current flows in the initial stage of lighting depending on the lamp specification and circuit conditions. This excessive current in the initial stage of turning on a lamp is generally called an "overflow." The amount of the excessive current or overflow varies greatly according to the conditions under which a lamp is lighted, and the effect of overflow depends on the length of time intervals with which the lamp may be intermittently flickered.

A voltage-load current characteristic under normal lighting conditions of an incandescent lamp is shown in FIG. 2. The abscissa shows the voltage V, while the ordinate shows the current I, in a circuit including four lamps connected in parallel with each other. In this drawing, a detection level is set at the loading current $I_D$ when the voltage across the parallel-connected four lamps is 9 V. If one of the four lamps is disconnected, a current corresponding to the voltage 15.5 V is equal to the load current $I_D$ of the detection level. Accordingly, this voltage range from 9 V to 15.5 V constitutes working voltages capable of detecting the breaking of a wire. Actually, however, this voltage range is smaller due to the above-mentioned overflow. Further, because of variations and unbalance in the detection level, it is possible only to detect the disconnection of one out of two parallel-connected lamps. Even if the effect of overflow is eliminated somehow, it is at most a one-third reduction in the load that can be detected in such an application field as an automobile where a source voltage varies widely from 10 V to 15.6 V. In an automobile, however, it is common practice to connect four or more lamps in parallel, and hence the device with the conventional construction cannot meet the requirements.

SUMMARY OF THE INVENTION

Accordingly, it is an object of the invention to provide a wire-breakage indicating device for automobile lights in which contacts of an indicator circuit are opened or closed by a combination of a current winding supplied with the lamps' load current and a voltage winding oppositely poled from that of the current winding for generating a small opposite magnetomotive force, whereby disconnection of one of four or more parallel-connected lamps is successfully detected and indicated under widely varying conditions of a source voltage, thus overcoming the limitation in detection of lamp disconnection which is posed by the load characteristic of lamps.

According to the invention, variations in magnetomotive force according to the voltage across a current winding are adroitly compensated for by a voltage winding so that variations in the combined magnetomotive force according to the source voltage are maintained low. Therefore, it is possible to positively detect the disconnection of one or more lamps out of four parallel-connected lamps.

In addition, disconnection of one out of more than four parallel-connected lamps can be detected by appropriately selecting the value of magnetomotive force of the oppositely poled voltage winding.

The device of the invention is also provided with a resistor in series with the voltage winding and in parallel with a capacitor. As a result, the voltage winding is short-circuited by the capacitor in the intial stage of energization after closing a switch, and therefore the initial magnetomotive force is always larger than the one under normal conditions, so that a normally-closed contact is temporarily opened regardless of whether there is an overflow or not. Thus, the level of detection of variations in load is set by the magnetomotive force required to hold the normally-closed contact in an opened state, thereby enabling positive detection of a disconnected lamp under any conditions of overflow. Also, since a resistor is connected in series with the voltage winding and in parallel with a capacitor, the resistor is short-circuited by means of the capacitor at the initial stage of energization thereof after closing a switch and the magnetomotive force of the voltage winding can be made larger, so that an overflow in the load does not cause the contacts of the indicator circuit to be attracted. Instead, the level of detection of variations in the load is always determined by the power of attracting the contacts, thereby achieving accurate detection of lamp disconnection.

DESCRIPTION OF THE PREFERRED EMBODIMENTS

Figure 1:
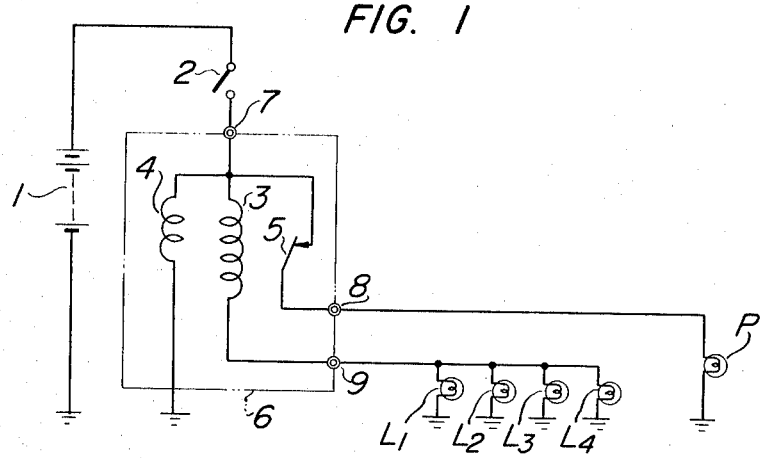
FIG. 1 is a diagram showing an electrical circuit of an embodiment of the invention.
Figure 2:
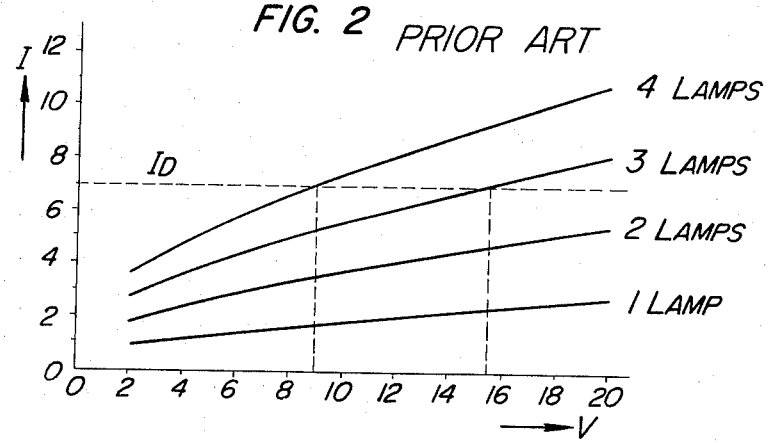
FIG. 2 is a diagram showing a voltage-current characteristic of lamps (load), explaining the disconnection-detecting functions of a conventional device.

An embodiment of the invention will be now explained with reference to FIG. 1. The reference numeral 1 shows a power supply, numeral 2 a switch, numeral 3 a current winding, numeral 4 a voltage winding, numeral 5 a normally-closed contact and characters $L_1$ to $L_4$ show lamps of an automobile including a stop lamp and a side marker lamp. The character P shows a pilot lamp used as an indicator. Numeral 6 shows a disconnection-detecting relay and numerals 7, 8 and 9 terminals thereof.

The device is so constructed that the current winding 3 and the voltage winding 4 are electromagnetically oppositely poled to each other. And the magnetomotive force of the voltage winding 4 is set at a level lower than that of the current winding 3. In other words, the magnetomotive force of the voltage winding 4 is one-third to one-fourth of that generated in the current winding 3 by a load current when all the load lamps are lighted under normal conditions. The current winding 3 and voltage winding 4 are wound on a single iron core so that a combined magnetomotive force of the winding 3 and 4 drives the normally-closed contact 5.

Figure 3:
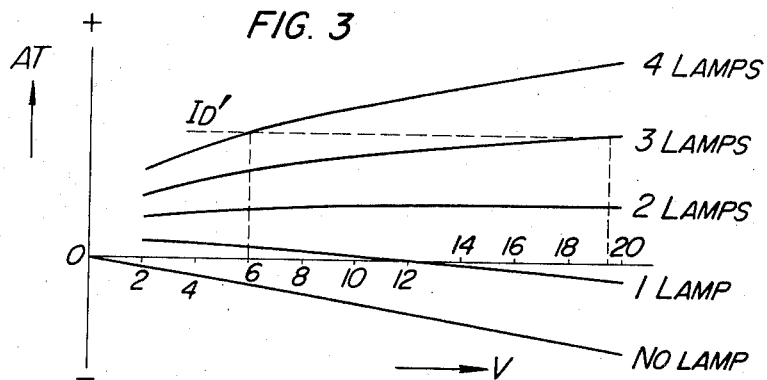
FIG. 3 is a diagram showing the disconnection-detecting characteristic of the device according to the invention.

The relationship between the combined magnetomotive force of the current winding 3 and voltage winding 4 in the embodiment of FIG. 1 is shown in FIG. 3 with the abscissa and ordinate respectively representing the voltage V and combined magnetomotive force AT. The example shown in FIG. 3 is one in which the magnetomotive force of the voltage winding 4 is equal to that of the current winding 3 which is generated by a load corresponding to one lamp at 12 V.

The operation of the device with the above-mentioned construction will be now explained. When the switch 2 is closed, a voltage from power supply 1 is applied to the load lamps $L_1$ to $L_4$ through the current winding 3, thereby lighting them. At the same time, the voltage from the power supply 1 is applied to the voltage winding 4, with the result that the predetermined magnetomotive forces are generated in the current winding 3 and the voltage winding 4. In FIG. 3, assuming that a combined magnetomotive force corresponding to four lamps is generated and that the magnetomotive force required to attract the normally-closed contact 5 is set at $I_D'$, the normally closed contact 5 is opened at 6 V or more of the source voltage and no source voltage is applied to the indicator P. Therefore, the indicator P is not energized. When one of the load lamps $L_1$ to $L_4$ is disconnected, the magnetomotive force generated in the current winding 3 is reduced and this causes a combined magnetomotive force corresponding to three lamps shown in FIG. 3. As a result, the magnetomotive force $I_D'$ required to attract the normally-closed contact 5 is obtained only at a source voltage higher than 19.5 V. Therefore, the normally-closed contact 5 is not opened in the normal voltage range from 10 V to 15.6 V, thus applying the source voltage to the indicator P. Accordingly, the indicator P operates and indicates the breaking of wire on application thereto of the source voltage through the normally-closed contact 5 when at least one of the lamps $L_1$ to $L_4$ fails due to its disconnection.

The reason why the disconnection of even one of the four lamps $L_1$ to $L_4$ can be detected is that, as shown in FIG. 3, variations in the combined magnetomotive force of the current winding 3 and the voltage winding 4 are less affected by the voltage variations.

This is achieved by the fact that the variations in the magnetomotive force of the current winding 3 is adroitly compensated for by that of the voltage winding 4. In other words, the current in the current winding 3 depends on the characteristics of the load lamps $L_1$ to $L_4$, and the current in the load lamps is proportional to 0.5th to 0.6th power of the source voltage. Therefore, the current in the current winding 3 is also proportional to the 0.5th to 0.6th power of the source voltage. On the other hand, the voltage winding 4 is connected directly to the power supply 1 not through the lamp load, and therefore the current in the voltage winding varies directly in response to the variations in the source voltage. That is to say, it varies in proportion to the first power of the source voltage. Consequently, the current in the current winding 3 varies less than the current in the voltage winding 4 in response to the variations in the source voltage.

When the source voltage is low, the magnetomotive force generated in the voltage winding 4 is reduced more than that generated in the current winding 3, with the result that the voltage winding 4 is demagnetized more than under normal conditions. Therefore, the combined magnetomotive force of the winding 3 and 4 is reduced only a little.

When the source voltage is high, by contrast, the magnetomotive force generated in the voltage winding 4 is increased at a higher rate than that in the current winding 3, so that the voltage winding 4 is demagnetized more than under normal conditions, with the result that the combined magnetomotive force of the windings 3 and 4 increases only a little.

It will be understood from the above description that variations in magnetomotive force in the current winding 3 is adroitly compensated for by the voltage winding 4 in order to minimize the variations in the combined magnetomotive force of the windings 3 and 4 according to the variations in voltage.

In the above-described embodiment which is intended for detection of disconnection of one of the four lamps $L_1$ to $L_4$, the ratio of magnetomotive force between the current winding 3 and the voltage winding 4 is set at 4 to 1. Therefore, the disconnection or breaking of the wire of one lamp may be detected in the approximate voltage range from 6 V to 19.5 V. If the ratio is set at 3 to 1, however, the compensation by the magnetomotive force by the voltage winding 3 becomes more effective, widening the voltage range where the breaking of wire of one lamp is detected. Also, when a narrower voltage range suffices, the ratio of magnetomotive force may be enlarged to, say, 5 to 1 to decrease the phase-inverted magnetomotive force of the voltage winding 4, making it possible to design an economical and compact current winding 3.

When more than four lamps are used, the breaking of wire of one lamp can be detected by making the ratio smaller between the magnetomotive forces of the current winding 3 and voltage winding 4.

In the above-described embodiment, the contact 5 which is driven by the current winding 3 and voltage winding 4 is normally closed, and the indicator P is rendered inoperative under normal lamp conditions, while it is operative at the time of disconnection of a lamp without opening the normally-closed contact 5. If a normally-opened contact is used in place of the normally-closed contact 5, the indicator P can be adapted to operate under normal lamp conditions, while stopping its operation at the time of disconnection of a lamp.

The embodiment shown in FIG. 4 will now be explained. This embodiment differs from the one of FIG. 1 only in that the voltage winding 4 is connected in series with a resistor 4 and in parallel with a capacitor 11. Therefore, the explanation will be limited to the difference.

Figure 4:
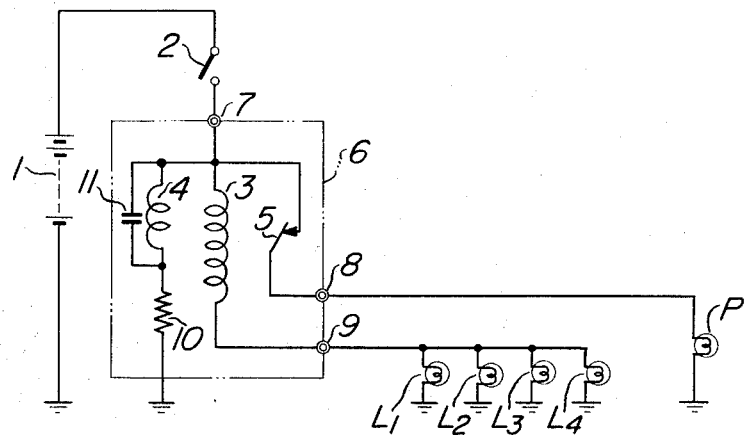
FIG. 4 is an electrical circuit diagram showing another embodiment of the device according to the invention.

With reference to the operation of the circuit shown in FIG. 4, closing the switch 2 causes the lamps $L_1$ to $L_4$ to be light upon application thereto of a voltage from the power supply 1 through the current winding 3. At the same time, the voltage is applied from the power supply 1 to the voltage winding 4. At the initial stage of voltage application, however, the voltage winding 4 is short-circuited by the capacitor 11 and the magnetomotive force of the voltage winding 4 gradually increases as the capacitor 11 is charged, until the predetermined magnetomotive forces are generated in the current winding 3 and voltage winding 4. As can be seen from the above description, the voltage winding 4 is short-circuited by the capacitor 11 and generates no magnetomotive force at the initial stage of closing the switch 2. Therefore, the normally-closed contact 5 is temporarily opened without fail by the magnetomotive force of the current winding 4 regardless of whether there is an overflow or not. Then, when normal conditions are achieved, a combined magnetomotive force corresponding to four lamps is generated as shown in FIG. 3.

Also, as described earlier, according to this invention, the voltage winding 4 is short-circuited by the capacitor 11 immediately after the switch 2 is closed, whereby the magnetomotive force of the current winding 3 temporarily opens the normally-closed contact 5 so that the level of detection of load variations is always set at that of the magnetomotive force required to hold the normally-closed contact 5 open. As a result, it is possible to detect the disconnection of a lamp accurately without being affected by the overflow. Generally, the magnetomotive force required to attract the contacts is larger than that required to hold them open due to a difference in the magnetic circuit between the time of attraction and the time of opening. Therefore, the magnetomotive force required for attraction takes a different value from that required for holding the contacts open.

When no capacitor is provided, the normally-closed contact 5 is temporarily opened by an overflow and the level of detecting the variations in load is set at the magnetomotive force required to hold open the normally-closed contact 5. However, in the absence of an overflow (i.e., when the temperature of the filament is high as the lamps are lighted intermittently), no temporary opening of the normally-closed contact 5 occurs at the time of lamp disconnection, so that the level for detection of load variations is set by the magnetomotive force required to attract the contacts. Consequently, the level for detecting the load variations differs from that where there is the absence of an overflow, causing an erroneous operation.

According to the invention, by contrast, the capacitor 11 functions to open the normally-closed contact 5 temporarily without fail, so that the level detection of load variations is always set by the magnetomotive force required to hold the normally-closed 5 open. Therefore, the disconnection of the lamp is positively detected regardless of whether an overflow occurs or not.

Figure 5:
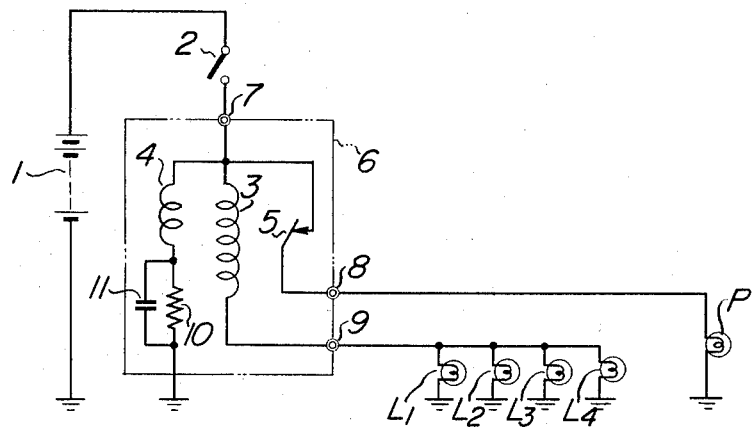
FIG. 5 is an electrical circuit diagram showing still another embodiment of the device according to the invention.

A third embodiment as shown in FIG. 5 will now be explained. This embodiment differs from the first embodiment of FIG. 1 only in that the voltage winding 4 is connected in series with the resistor 10 which in turn is connected in parallel with the capacitor 11. So, the explanation here will be limited to the difference.

Referring to the operation of this embodiment, closing the switch 2 causes the load lamps $L_1$ to $L_4$ to be lighted on application thereto of a voltage from the power supply 1 through the current winding 3. At the same time, the voltage from the power supply 1 is applied also to the voltage winding 4. In the initial stage of voltage application, the resistor 10 in series with the voltage winding 4 is short-circuited by capacitor 11, causing a large current to flow in the voltage winding 4 to generate a large magnetomotive force therein. At the same time that the capacitor 11 is charged, magnetomotive force in the voltage winding 4 begins to decline gradually, causing predetermined magnetomotive forces to be achieved in the current winding 3 and voltage winding 4 respectively.

Since the resistor 10 is short-circuited by the capacitor 11 at the initial stage of closing the switch 2, magnetomotive force in the voltage winding 4 becomes sufficiently large compared with that under normal conditions, so that excessive magnetomotive force generated in the current winding 3 due to an overflow can be offset, preventing the normally-closed contact 5 from being opened. When normal conditions are achieved later, combined magnetomotive force corresponding to the four lamps is generated.

In addition, the device of the invention is so constructed that immediately after the closing of the switch 2, the resistor 6 is short-circuited by means of the capacitor 11 in order to generate a large magnetomotive force in the voltage winding 4. Therefore, even if an overflow occurs in the current winding 3, the excessive magnetomotive force due to the overflow can be offset, thus preventing the normally-closed contact 5 from being opened. Accordingly, the level of detection of load variations is always set by the magnetomotive force required to attract the normally-closed contact 5, making it possible to detect the disconnection of a lamp positively without being affected by the overflow.

Generally, the magnetomotive force required to attract a contact of a relay is larger than that required to hold the contact open due to the difference in the magnetic circuit between the time of contact closing and the time of contact opening. As a result, the magnetomotive force required to attract the contact takes a different value from that required to the hold it open.

An overflow causes the normally-closed contact 5 to temporarily open in the absence of the capacitor 11, so that the level for detection of load variations is determined by the magnetomotive force required to hold the normally-closed contact 5 open. When no overflow occurs (i.e. when the temperature of a filament is high with the lamps lit intermittently), by contrast, no temporary opening of the normally-closed contact 5 occurs, with the result that the level for detection of load variations is determined by the magnetomotive force required to attract the contact. As a consequence, the level for detection of load variations in the presence of an overflow differs from that in the absence thereof, resulting in an erroneous operation. The invention overcomes such a problem by preventing the normally-closed contact 5 from being opened due to the capacitor 11 regardless of whether there is an overflow or not, so that the level for detection of load variations is always determined by the magnetomotive force required to attract the normally-closed contact 5, thus enabling the detection of lamp disconnection accurately without being affected by the overflow.

In the above-described embodiment, the normally-closed contact 5 is driven by the current winding 3 and voltage winding 4 in order to de-energize the indicator P under normal lamp conditions, while the indicator P is operated at the time of disconnection of a lamp with the normally-closed contact 5 kept closed. If a normally-opened contact is used as an alternative, it is possible to operate the indicator P under normal lamp conditions, while deenergizing it at the time of lamp disconnection. In this case, too, the level for detection of load variations is determined by the magnetomotive force required to attract the normally-opened contact without being affected by an overflow.

I claim:

1. A system for indicating disconnection of automotive lamps comprising an electric source having a predetermined nominal voltage output, a plurality of more than two automotive lamps connected in parallel with each other, disconnection indicating means, a relay having a current winding connected between said electric source and said more than two automotive lamps, for generating a magnetomotive force; said relay having a voltage winding, connected in parallel with the combination of said current winding and said more than two automotive lamps for generating an opposite magnetomotive force to that of said current winding; said voltage winding being connected in series with a resistor and in parallel with a capacitor; said relay further having a relay contact, connected between the junction point of said two windings and said disconnection indicating means, for interrupting the electric current through said disconnection indicating means when the net magnetomotive force of said two windings becomes above a predetermined value; said current and voltage windings of said relay being designed so that the opposite magnetomotive force generated by said voltage winding is a predetermined amount less than the magnetomotive force generated by said current winding when all of said more than two automotive lamps are connected with the net magnetomotive force consisting of said magnetomotive force less said opposite magnetomotive force being sufficient to actuate said relay contact to interrupt current flow, said predetermined amount by which said opposite magnetomotive force is less than said magnetomotive force being determined by requiring the change in net magnetomotive force caused by current reduction through said current coil due to disconnection of one of said more than two automotive lamps to be greater than changes in net magnetomotive force due to a decrease in voltage output of said electric source of predetermined amount from its nominal value or to an increase in voltage output of said electric source a predetermined amount from its nominal value whereby changes in voltage output of said electric source within the predetermined limits which increase the net magnetomotive force are insufficient to increase said net magnetomotive force to a value which would actuate said relay contact if one of said more than two automotive lamps is disconnected and changes in voltage output of said electric source within the predetermined limits which decrease the net magnetomotive force are insufficient to decrease said net magnetomotive force to a value which would prevent actuation of said relay contact when all of said more than two automotive lamps are connected.

2. A system for indicating disconnection of automotive lamps comprising an electric source having a predetermined nominal voltage output, a plurality of more than two automotive lamps connected in parallel with each other, disconnection indicating means, a relay having a current winding connected between said electric source and said more than two automotive lamps, for generating a magnetomotive force, said relay having a voltage winding, connected in parallel with the combination of said current winding and said more than two automotive lamps for generating an opposite magnetomotive force to that of said current winding; said voltage winding being connected in series with a resistor which is in turn connected in parallel with a capacitor; said relay further having a relay contact, connected between the junction point of said two windings and said disconnection indicating means, for interrupting the electric current through said disconnection indicating means when the net magnetomotive force of said two windings becomes above a predetermined value; said current and voltage windings of said relay being designed so that the opposite magnetomotive force generated by said voltage winding is a predetermined amount less than the magnetomotive force generated by said current winding when all of said more than two automotive lamps are connected with the net magnetomotive force consisting of said magnetomotive force less said opposite magnetomotive force being sufficient to actuate said relay contact to interrupt current flow, with said predetermined amount by which said opposite magnetomotive force is less than said magnetomotive force being determined by requiring the change in net magnetomotive force caused by current reduction through said current coil due to disconnection of one of said more than two automotive lamps to be greater than changes in net magnetomotive force due to a decrease in voltage output of said electric source a predetermined amount from its nominal value or to an increase in voltage output of said electric source a predetermined amount from its nominal value whereby changes in voltage output of said electric source within the predetermined limits which increase the net magnetomotive foroce are insufficient to increase said net magnetomotive force to a value which would actuate said relay contact if one of said more than two automotive lamps is disconnected and changes in voltage output of said electric source within the predetermined limits which decrease the net magnetomotive force are insufficient to decrease said net magnetomotive force to a value which would prevent actuation of said relay contact when all of said more than two automotive lamps are connected.

* * * * *